United States Patent [19]

Bonk et al.

[11] 4,306,052

[45] Dec. 15, 1981

[54] THERMOPLASTIC POLYESTER POLYURETHANES

[75] Inventors: Henry W. Bonk, Wallingford; Richard W. Oertel, Guilford, both of Conn.

[73] Assignee: The Upjohn Company, Kalamazoo, Mich.

[21] Appl. No.: 190,724

[22] Filed: Sep. 25, 1980

[51] Int. Cl.³ .................... C08G 18/77; C08G 18/42
[52] U.S. Cl. ........................................ 528/67; 528/51; 528/53; 528/55; 528/56; 528/58; 528/73
[58] Field of Search ................ 528/67, 73; 521/160, 521/161

[56] References Cited

U.S. PATENT DOCUMENTS

| | | | |
|---|---|---|---|
| 3,193,522 | 7/1965 | Neumann et al. | 260/45.9 |
| 3,226,368 | 12/1965 | Reischl et al. | 521/901 |
| 3,248,373 | 4/1966 | Barringer | 260/77.5 |
| 3,394,111 | 7/1968 | Liebsch | 521/161 |
| 3,761,502 | 9/1973 | Kan et al. | 260/453 P |
| 3,907,780 | 9/1975 | Hughes | 521/161 |
| 3,929,733 | 12/1975 | Alberino | 528/67 |
| 4,031,026 | 6/1977 | Ibbotson | 528/73 |
| 4,088,665 | 5/1978 | Findeisen et al. | 521/901 |
| 4,120,884 | 10/1978 | Woerner et al. | 260/453 AM |
| 4,154,752 | 5/1979 | Sundermann et al. | 260/453 AM |
| 4,177,205 | 12/1979 | Schaaf et al. | 260/453 AM |
| 4,184,031 | 1/1980 | Graham et al. | 528/55 |
| 4,199,524 | 4/1980 | Schaaf et al. | 260/453 SP |
| 4,239,857 | 12/1980 | Harper | 528/73 |

*Primary Examiner*—H. S. Cockeram
*Attorney, Agent, or Firm*—James S. Rose; Denis A. Firth

[57] ABSTRACT

Novel thermoplastic polyester polyurethanes are disclosed which are obtained by reacting a polyester diol, a difunctional extender, a methylenebis(phenyl isocyanate), and from about 0.0025 mole to about 0.03 mole per equivalent of isocyanate of a monocarbodiimide product derived from a methylenebis(phenyl isocyanate) or the corresponding uretidinedioneimine adduct thereof with said latter methylenebis(phenyl isocyanate).

The polyester polyurethanes are characterized by a combination of thermoplasticity, extremely good hydrolytic stability which cannot be diminished by solvent action, good physical properties, particularly tensile strength and elongation, and enhanced clarity of molded articles.

9 Claims, No Drawings

THERMOPLASTIC POLYESTER POLYURETHANES

BACKGROUND OF THE INVENTION

1. Field of the Invention

This invention relates to polyurethane elastomers and is more particularly concerned with hydrolytically stable polyester polyurethane elastomers.

2. Description of the Prior Art

The preparation of thermoplastic polyurethane elastomers from polyester polyols is well known in the art. Such elastomers can be extruded, injection molded, cast and fabricated in other known manner. Generally speaking, such polyester based polyurethane elastomers are recognized for their greater resistance to high temperatures as compared to their polyether polyol based counterparts. However, the latter polyether based polyurethanes enjoy a recognized advantage in hydrolytic stability over the polyester materials.

Hydrolytic instability of polyester polyurethanes, or, their loss in physical properties when exposed to hydrolyzing conditions such as the combination of high temperature and humidity, has long been recognized in the art. Also receiving long recognition has been the concept of relying on carbodiimide containing additives both reactive and non-reactive types to impart enhanced hydrolytic stability to various polymer systems including, particularly, polyester polyurethanes. Presumably, the carbodiimide additives function in the polymer by virtue of the quick reaction of the carbodiimide linkage with a water molecule to form a urea thereby preventing polymer molecular weight reduction which would otherwise occur via scission of polymer links by aqueous hydrolysis of the ester functions.

Typical of the prior art methods for stabilizing polyester polyurethane elastomers is the use of Isonate® 143L as the diisocyanate in the preparation of one-shot elastomers which are not thermoplastic. The 143L liquid diisocyanate is a proprietary product which contains; carbodiimide linkages which, in turn, impart the hydrolytic stability to the final polymer; see Upjohn Tech. Bull. 402, June 1, 1969 entitled "The Use of Isonate® 143L in Urethane Elastomers". It should be noted that the polyester polyurethanes obtained are not thermoplastic.

Further, it is known to employ carbodiimide containing isocyanates in the preparation of cast polyester polyurethanes; see U.S. Pat. No. 4,088,665, example 17.

U.S. Pat. No. 3,193,522 teaches the stabilization of vulcanized or cross-linked polyesters and polyester urethanes through the addition of polycarbodiimide additives having more than 3 carbodiimide groups in the polycarbodiimide chain, and, optionally, the presence of isocyanate groups also in the polycarbodiimide chain which would allow the chemical incorporation of the polycarbodiimide into the polyester urethane.

U.S. Pat. No. 3,226,368 discloses the preparation of polyester polyurethanes wherein excess isocyanate over and above that required to react with the polyester polyol is concomitantly reacted in the presence of a carbodiimide forming catalyst to form a large number of carbodiimide groups in the polyurethane chain. However, this method of production is not suitable when a fast type of polymerization process is required, typically, when the polyurethane is being prepared in a screw extruder or the like. The gas evolving carbodiimide formation would create bubbles or voids in the polymer as it was being extruded. In fact, this particular reference at column 1 beginning at line 24 seeks to avoid accelerated reactions and specifically calls for a slow reacting system which would be suitable for casting techniques where prolonged pot life is required.

We have now discovered how to prepare thermoplastic polyester polyurethanes which are characterized by a high degree of hydrolytic stability when tested under rather severe conditions of humid aging.

Further, because the carbodiimide entity which imparts hydrolytic stability is polymerized into the polyurethane chain it cannot be solvent leached or extracted from the polymer. Contrastingly, the majority of the prior art methods providing for enhancement of hydrolytic stability of polyester polyurethanes are not leach resistant (see the comparison of sample 4 versus samples 7 and 8 set forth in Example 2 below).

Surprisingly, the physical properties of the polyester polyurethanes of the present invention, particularly tensile strengths and elongations, are superior to prior art polyester polyurethanes having large amounts of polycarbodiimide prepared in situ during polyurethane formation or those having additive carbodiimides (see U.S. Pat. Nos. 3,226,368 and 3,193,522 cited supra) to achieve solvent resistant hydrolytic stability.

Most surprising, however, is the fact that the present thermoplastic polyester polyurethanes have all of the above features combined with the fact that the polymers are completely clear with transparent clarity. The combination of all of these properties, i.e. thermoplasticity, hydrolytic stability, solvent resistance, superior tensile strength and elongation, and very good polymer clarity, has not hitherto been found in one thermoplastic polyester polyurethane to our knowledge.

SUMMARY OF THE INVENTION

This invention comprises thermoplastic polyurethanes prepared from a polyester diol, a difunctional extender, and methylenebis(phenyl isocyanate) wherein the improvement comprises employing a methylenebis(phenyl isocyanate) and from about 0.0025 mole to about 0.03 mole per equivalent of isocyanate of (i) a monocarbodiimide product derived from a methylenebis(phenyl isocyanate) or (ii) the corresponding uretidinedioneimine adduct formed by said monocarbodiimide with said methylenebis(phenyl isocyanate).

The term "thermoplastic" is used in the generally accepted sense known to those skilled in the polymer art to mean, inter alia, the ability to be injection molded.

The term "polyester diol" means the polymeric polyester diols having a molecular weight falling within the range of about 400 to about 6000, preferably from about 500 to about 3000, and is inclusive of polyalkylene ester diols, polyoxyalkylene ester diols, polyoxyalkanoyl diols, and the like. Preferred as a class are the polyalkylene ester diols.

The term "difunctional extender" is used in the commonly accepted sense to one skilled in the art and means glycols, diamines, amino alcohols and the like having a molecular weight falling within a range from about 60 to about 300. Preferred as the difunctional extenders are the aliphatic straight chain diols having from two to six carbon atoms, inclusive.

The term "methylenebis(phenyl isocyanate)" is inclusive of mixtures of 4,4'-methylenebis(phenyl isocyanate) with up to 20 percent by weight of the 2,4'-isomer but preferred is the 4,4'-isomer with no more than 10 percent 2,4'-isomer. Most preferred is the essentially pure 4,4'-isomer.

The term "monocarbodiimide product" as used throughout the specification and claims means the carbodiimide product.

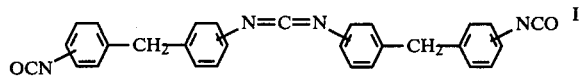

obtained by the elimination of a mole of carbon dioxide between 2 moles of methylenebis(phenyl isocyanate) while the term "uretidinedioneimine adduct thereof" refers to the adduct which forms in equilibrium between said (I) and said methylenebis(phenyl isocyanate) and which has the formula:

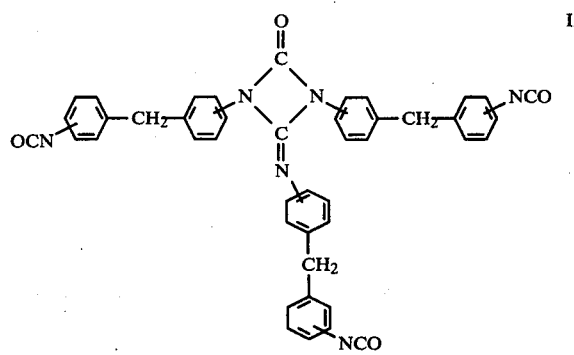

The term "mole" in reference to the monocarbodiimide product (I) or the adduct (II) means the mole weight of said (I) or said (II).

DETAILED DESCRIPTION OF THE INVENTION

The polyurethane elastomers of the invention can be prepared by processes conventional in the art for the synthesis of polyurethane elastomers, the novel feature being the use of the modified methylenebis(phenyl isocyanate) defined above. The conventional preparative processes include the one-shot procedure, in which all the reactants are brought together simultaneously, and the prepolymer procedure, in which the isocyanate (modified as described herein) is reacted with a portion, or the whole, of the polymeric diol in a first step and the isocyanate-terminated prepolymer so produced is subsequently reacted with the remainder of the polyol and or extender. The one-shot method is the preferred procedure for preparing the elastomeric polyurethanes of the invention. In a most preferred embodiment, the elastomeric polyurethanes of the inventon are prepared by a continuous one-shot procedure such as that set forth in U.S. Pat. No. 3,642,964.

The methylenebis(phenyl isocyanate) which is employed as the primary diisocyanate in the preparation of the polyurethane elastomers of the invention, as noted above, can include isomer mixtures other than the pure 4,4'-isomer, however, this latter isomer in relatively pure form is the most preferred in order to achieve maximum elastomer physical properties.

Primarily, the novelty of the present invention resides in the inclusion in the reaction mixture of the monocarbodiimide product (I) or the equilibrium uretidinedioneimine adduct thereof (II) in the concentration set forth above, preferably from about 0.006 to about 0.02 mole, and, most preferably, from about 0.008 to about 0.017 mole per isocyanate equivalent.

It will be understood by those skilled in the art that the isocyanate equivalent referred to above includes the isocyanate groups from the primary diisocyanate or methylenebis(phenyl isocyanate), plus the isocyanate groups present on (I) and/or (II). It will also be obvious to those skilled in the art that the monocarbodiimide (I) contains two isocyanate groups while the adduct (II) carries three isocyanate groups. However, at elevated temperatures the adduct readily dissociates back to difunctional isocyanate reactants (see U.S. Pat. No. 4,143,063 column 2, line 50 to column 3, line 20) and reacts thusly.

Generally speaking, the carbodiimide (I) or adduct (II) need not be prepared from the identical isomer mixture of methylenebis(phenyl isocyanate) that is employed as the primary diisocyanate reactant. That is to say, the carbodiimide (I) or adduct (II) can be prepared from one methylenebis(phenyl isocyanate) isomer mixture as defined above and then used in combination with another methylenebis(phenyl isocyanate) isomer mixture in accordance with the present invention.

Preferably, the same methylenebis(phenyl isocyanate) material is employed as the primary diisocyanate and as the precursor for the products (I) or (II). Furthermore, the preferred methylenebis(phenyl isocyanate) employed in both cases is 4,4'-methylenebis(phenyl isocyanate). The latter term is used throughout the specification and claims to mean a methylenebis(phenyl isocyanate) which contains at least about 95 percent by weight of the 4,4'-isomer the remainder being 2,4'-isomer and or 2,2'-isomer. A preferred product is one containing at least about 98% by weight of 4,4'-isomer.

If the monocarbodiimide (I) has been prepared by converting part of a batch of methylenebis(phenyl isocyanate) to monocarbodiimide (I) and allowing the product to stand at room temperature, the monocarbodiimide (I) will normally be present in the reaction product as the adduct (II). The product so obtained can either be added directly to the reaction mixture, or, preferably, be blended prior to reaction into the additional methylenebis(phenyl isocyanate) component required to meet the total proportions of methylenebis(phenyl isocyanate) set forth above.

In another embodiment in accordance with the present invention there is employed a methylenebis(phenyl isocyanate) treated in accordance with any one of the prior art methods for forming (I) and/or (II) in the proportions falling within the ranges called for above. However, the prior art methods usually result in much higher levels of carbodiimide product than could be tolerated in the present processes. Therefore, they must be modified or the products diluted to reduce the carbodiimide content to a lower level. Otherwise, attempts to use these higher levels of carbodiimide products result in loss of polymer thermoplasticity. For typical methods for obtaining such carbodiimide containing methylenebis(phenyl isocyanate) products see U.S. Pat. Nos. 3,384,653, 3,761,502, 4,014,935, 4,088,665, 4,120,884, 4,143,063, 4,154,752, 4,177,205, and 4,199,524.

In a preferred embodiment in accordance with the present invention blends of 4,4'-methylenebis(phenyl isocyanate) with 4,4'-methylenebis(phenyl isocyanate) containing from about 0.015 to about 0.17 mole of (I) or (II) per equivalent of said latter isocyanate are employed in such proportions that the concentration of (I)

or (II) in the final blend falls within the range set forth above. Using this embodiment one is not limited to the preparation of a particularly low level of carbodiimide but can take any proportion and dilute it down to the ranges set forth above.

A particularly preferred blend is comprised of from about 50 to about 95 equivalent percent of 4,4'-methylenebis(phenyl isocyanate) and the remaining 5 to 50 equivalent percent being a 4,4'-methylenebis(phenyl isocyanate) containing from about 0.05 mole to about 0.06 mole of the corresponding (I) or (II) per equivalent of said latter isocyanate.

The methylenebis(phenyl isocyanate) is employed in the proportions such that the overall ratio of equivalents of isocyanate to equivalents of active hydrogen containing materials is within the range of 0.95:1 to 1.10:1, and preferably 0.98:1 to 1.04:1.

Any of the polyester diols known to those skilled in the art and meeting the above definitions can be used in the present invention. The polyester diols include the essentially linear polymeric diols which are obtained by esterification of an aliphatic or aromatic dibasic acid or anhydride with a glycol. Preferably the glycol is employed in excess of the stoichiometric proportion with respect to the acid or anhydride in order to ensure that the polyesters are hydroxyl-terminated. Representative dicarboxylic acids (or their anhydrides) employed in the preparation of the polyester diols are adipic, succinic, pimelic, suberic, azelaic, sebacic, terephthalic, phthalic, and the like acids or their anhydrides or mixtures of two or more of said acids or anhydrides. Adipic acid is the preferred acid. Representative glycols employed in the preparation of the polyalkylene ester diols are the straight chain aliphatic glycols containing from 2 to 10 carbon atoms, inclusive, such as ethylene glycol, propane-1,3-diol, butane-1,4-diol, 2-butene-1,4-diol, hexane-1,6-diol, octane-1,8-diol, decane-1,10-diol, and the like, or mixtures of two or more such glycols.

Representative of glycols employed in the preparation of the polyoxyalkylene ester diols are diethylene glycol, dipropylene glycol, and the like.

Representative of the polyoxyalkanoyl diols are the polycaprolactone diols which are prepared by polymerizing the appropriate caprolactone with the appropriate difunctional initiator, such as an aliphatic glycol as exemplified above or an alkanolamine, and the like. Such procedures and products are well known in the art; see for example, U.S. Pat. No. 2,914,556.

Preferred species of polyester diols include polyethylene adipate, polypropylene adipate, and polybutylene adipate.

Illustrative of the aliphatic diol extenders are ethylene glycol, 1,3-propylene glycol, 1,2-propylene glycol, 1,4-butanediol, 1,2-hexanediol, neopentyl glycol, and the like; and dihydroxyalkylated aromatic compounds such as the bis(2-hydroxyethyl)ethers of hydroquinone and resorcinol; p-xylene-$\alpha,\alpha'$-diol; the bis(2-hydroxyethyl)ether of p-xylene-$\alpha,\alpha'$-diol; m-xylene-$\alpha,\alpha'$-diol and the bis(2-hydroxyethyl)ether thereof. Illustrative of diamine extenders are aromatic diamines such as p-phenylenediamine, m-phenylenediamine, benzidine, 4,4'-methylenedianiline, 4,4'-methylenebis(2-chloroaniline) and the like. Illustrative of amino alcohols are ethanolamine, propanolamine, butanolamine, and the like.

Preferred extenders include ethylene glycol, 1,3-propylene glycol, 1,4-butanediol, 1,2-hexanediol, and the like.

The proportion of polyester diol to extender can be varied within a wide range depending largely upon the desired hardness of the final polyurethane elastomer. Advantageously, the equivalent proportion of polyester diol to extender is within the range of 1:1 to 1:12, preferably 1:2 to 1:8.

As set forth above, the polyurethane elastomers of the invention are preferably made by the one-shot procedure and most preferably by a continuous one-shot procedure. In such procedures the reactants are brought together in any order. Advantageously, the polymeric diol and the extender are preblended and fed to the reaction mixture as a single component, the other major component being the modified diisocyanate. The mixing of the reactants can be accomplished by any of the procedures and apparatus conventional in the art. Preferably the individual components are rendered substantially free from the presence of extraneous moisture using conventional procedures, for example, by azeotropic distillation using benzene, toluene, and the like, or by heating under reduced pressure at a temperature above the boiling point of water at the pressure employed.

The mixing of the reactants can be carried out at ambient temperature (of the order of 25° C.) and the resulting mixture is then heated to a temperature of the order of about 40° C. to about 130° C., preferably to a temperature of about 90° C. to about 120° C. Alternatively, and preferably, one or more of the reactants is preheated to a temperature within the above ranges before the admixing is carried out. Advantageously, in a batch procedure, the heated reaction components are subjected to degassing in order to remove entrained bubbles of air or other gases before reaction takes place. This degassing is accomplished conveniently by reducing the pressure under which the components are maintained until no further evolution of bubbles occurs. The degassed reaction components are then admixed and transferred to suitable molds or extrusion equipment or the like and cured at a temperature of the order of about 20° C. to about 115° C. The time required for curing will vary with the temperature of curing and also with the nature of the particular composition. The time required in any given case can be determined by a process of trial and error.

It is frequently desirable, but not essential, to include a catalyst in the reaction mixture employed to prepare the compositions of the invention. Any of the catalysts conventionally employed in the art to catalyze the reaction of an isocyanate with a reactive hydrogen containing compound can be employed for this purpose; see, for example, Saunders et al., Polyurethanes, Chemistry and Technology, Part I, Interscience, New York, 1963, pages 228–232; see also, Britain et al., J. Applied Polymer Science, 4, 207–211, 1960. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese and zirconium, as well as phosphines and tertiary organic amines. Representative organotin catalysts are stannous octoate, stannous oleate, dibutyltin dioctoate, dibutyltin dilaurate, and the like. Representative tertiary organic amine catalysts are triethylamine, triethylenediamine, N,N,N',N'-tetramethylethylenediamine, N,N,N',N'-tetraethylethylenediamine, N-methylmorpholine, N-ethylmorpholine, N,N,N',N'-tetramethylguanidine, N,N,N',N'-tetramethyl-1,3-butanediamine, N,N-dimethylethanolamine, N,N-diethylethanolamine, and the like. The amount of catalyst employed is generally within the range of about 0.02 to about 2.0 percent by weight based on the total weight of the reactants.

When the compositions of the invention are prepared by the less preferred prepolymer method, the modified diisocyanate and the polymeric diol are reacted, if desired, in the presence of a catalyst as defined above, in a preliminary stage to form an isocyanate-terminated prepolymer. The proportions of modified diisocyanate and polymeric diol employed in the preparation of this prepolymer are consistent with the ranges defined above. The diisocyanate and the polymeric diol are preferably rendered substantially free from the presence of extraneous moisture, using the methods described above, before the formation of the prepolymer is carried out. The formation of the prepolymer is advantageously carried out at a temperature within the range of about 70° C. to about 130° C. under an inert atmosphere such as nitrogen gas in accordance with conventional procedures. The prepolymer so formed can then be reacted, at any desired time, with the extender to form the elastomers of the invention. This reaction is carried out advantageously within the range of reaction temperatures specified above for the one-shot procedure. In general the prepolymer and the extender are mixed and heated within the requisite temperature range while the mixture is degassed as described previously. The degassed mixture is then transferred to a suitable mold, extrusion apparatus, or the like, and cured as described for the one-shot procedure.

If desired, the elastomers of the invention can have incorporated in them, at any appropriate stage of preparation, additives such as pigments, fillers, lubricants, stabilizers, antioxidants, coloring agents, fire retardants, and the like, which are commonly used in conjunction with polyurethane elastomers.

The polyurethane elastomers of the invention are characterized by hydrolytic stability which equals, and, in some cases, surpasses similarly constituted polyurethanes which are stabilized by prior art methods. At the same time the elastomers of the invention are stable toward solvents whereas prior art polymers which have stabilizer additives tend to suffer diminution of hydrolytic stability because of solvent leaching of the stabilizers. Furthermore, the tensile strengths and elongations of the present elastomers exceed the corresponding values noted in the prior art for similar elastomers where the carbodiimide is formed concomitantly with polyurethane formation (as in U.S. Pat. No. 3,226,368).

Additionally, the elastomers of the invention are completely clear to light transmission with no blemishes or opacity.

The present invention makes possible the use of what the prior art has considered to be polyester diols of questionable utility because of their tendency to hydrolyze. At the same time such polyester diols are economically more attractive when compared to the polyether polyols.

The above advantageous features make the thermoplastic polyester polyurethanes of the present invention useful in the molding, extruding, or injection molding of blocks, films, tubing, ribbons, intricate profiles, cross-sections, and detailed parts which find utility in such applications as wheels, printing plates, gear wheels, treads for recreational vehicles such as snow-mobiles and all-terrain vehicles, various types of hose for transporting fluids and the like.

The following examples describe the manner and process of making and using the invention and set forth the best mode contemplated by the inventors of carrying out the invention but are not to be construed as limiting.

EXAMPLE 1

Two elastomer samples 1 and 2 were prepared using the reactants and proportions (expressed in equivalents) set forth in Table I. Sample 2 is in accordance with the present invention while sample 1 is not.

TABLE 1

| Sample | 1 | 2 |
|---|---|---|
| 4,4'-methylenebis(phenyl isocyanate); equiv. | 4.08 | — |
| 4,4'-methylenebis(phenyl isocyanate) carbodiimide blend[1]; equiv. | — | 4.08 |
| Polyethylene adipate diol MW = 2000; equiv. | 1 | 1 |
| 1,4-butanediol | 3 | 3 |
| Stannous octoate solution[2] % w/w | 0.02 | 0.02 |
| Lubricant (amide wax) % w/w | 0.25 | 0.25 |
| Antioxidant (hindered phenol) % w/w | 0.25 | 0.25 |
| NCO/OH | 1.02 | 1.02 |

Footnotes to Table I
[1]This is a blend of 75 equivalent percent of 4,4'-methylenebis(phenyl isocyanate) (MDI) with 25 equivalent percent of a 4,4'-methylenebis(phenyl isocyanate) containing about 0.056 mole per equivalent of isocyanate of the monocarbodiimide product or the corresponding uretidinedioneimine adduct thereof with said 4,4'-methylenebis(phenyl isocyanate); blend I.E. = 127.9; carbodiimide content = 0.014 mole per NCO eq.
[2]Solution is 50/50 w/w of stannous octoate dissolved in dioctyl phthalate as a carrier.

The following standard procedure was employed for the preparation of each of the samples. A 2000 ml. resin flask equipped with a stirrer, thermometer, and heating means was charged with the polyester, butanediol, antioxidant, and wax lubricant. The mixture was degassed by heating under reduced pressure (about 0.1 mm of Hg) for about 1½ hrs. at 90°–100° C. Enough of the hot degassed resin to produce about 600 g. of final product was weighed into an 800 ml. capacity polyethylene beaker followed by the stannous octoate solution. Mixing of the components was accomplished by manually stirring them with a spatula for about 10 seconds.

The melted MDI component (melted at about 60° C.) in a 250 ml. beaker in the case of sample 1, and the mixture of MDI and the second MDI component in the case of sample 2, was added quickly to the 800 ml. beaker and the reactants rapidly hand stirred with the spatula until a sudden viscosity increase was felt (generally speaking about 10 to 12 seconds). The reaction mixture was then immediately poured into a Teflon lined pan where it hardened to form a polyurethane slab.

The poured elastomer and tray were allowed to stand at room temperature (circa 20° C.) for 24 hours. Thereafter the elastomer was chopped into pieces, granulated and dried for 3 hours at 110° C. The dried material was then injection molded to form 4.5 inch ×4.5 inch ×1/16 inch sheets for test purposes. The injection molding barrel and mold temperature for sample 1 was 410° F. and 100° F. respectively. The corresponding temperatures for sample 2 were 430° F. and 100° F. Ambient temperature (circa 20° C.) cure of the molded samples for about 24 hours was observed.

In Table II are recorded the physical properties of three pairs of samples 1 and 2 after each pair had been exposed to test conditions (a), (b), and (c) respectively. Condition (a) was simply storage for 7 days at ambient conditions of temperature (72° F.), humidity, and air, and serves as the control condition.

Conditions (b), and (c) are well known aging conditions employed to effect rapid aging of rubbers and plastics, particularly under conditions of high humidity and heat and are described in detail below. Note particularly test condition (c) which is particularly useful in determining sample integrity under so-called hydrolyzing conditions.

Condition (b) was carried out in accordance with ASTM Test D 3137-75. Dumbbell shaped samples about 4.5" long were suspended above water at 85° C. for 96 hours followed by a conditioning at 23° C. and 50% relative humidity.

Condition (c) was the standard humid age test conditions where samples are stored for 30 days at 158° F. and 100% relative humidity. This latter condition is a particularly rigorous one for polymers containing ester and polyester linkages.

Both samples 1 and 2 were crystal clear with no signs of cloudiness when first prepared and upon storage under ambient conditions. A comparison of the various properties listed in Table II for samples 1a and 2a shows clearly the properties of the polyester polyurethane in accordance with the invention, namely 2a, are equal to those of the prior art sample 1a.

A comparison of the properties of 1b with 2b shows a slight superiority of 2b over 1b in regard to modulus at 300%, tensile strength, and tensile set. However, it is in the 1c versus 2c comparison that the very clear superiority in hydrolytic stability of polyester polyurethanes of the present invention over the prior art really stands out. Sample 1c simply disintegrated in the test jaws of the Instron tester while 2c still retained respectable integrity after being exposed to the humid age conditions (c).

TABLE II

| Aging Conditions | 1a | 2a | 1b | 2b | 1c | 2c |
|---|---|---|---|---|---|---|
| Hardness Shore A | 86 | 90 | | | | |
| Elastic Modulus, psi | | | | | | |
| 50% | 780 | 790 | 650 | 710 | sample disintegrated | 560 |
| 100% | 920 | 910 | 810 | 820 | | 780 |
| 300% | 1450 | 1480 | 1320 | 1470 | | 1290 |
| Tensile str., psi | 5390 | 6040 | 3200 | 5410 | | 3400 |
| Elongation at break (%) | 680 | 660 | 720 | 730 | | 710 |
| Tensile set, % | 50 | 140 | 130 | 60 | | 110 |
| Δ Volume, % | | | 1.8 | 1.5 | | |
| Δ Weight, % | | | 1.2 | 1.1 | | |

EXAMPLE 2

Using the apparatus and methods described in Example 1 and the reactants and proportions (expressed in equivalents) set forth in Table III, there were prepared polyester polyurethane samples 3 through 8 wherein only sample 4 was in accordance with the present invention.

TABLE III

| Sample | 3 | 4 | 5 | 6 | 7 | 8 |
|---|---|---|---|---|---|---|
| MDI; equiv. | 4.08 | — | 4.08 | 4.08 | 4.08 | 4.08 |
| MDI/carbodiimide blend[1]; equiv. | — | 4.08 | — | — | — | — |
| Polyethylene adipate diol (MW = 2000) | 1 | 1 | 1 | 1 | 1 | 1 |
| 1,4-butanediol | 3 | 3 | 3 | 3 | 3 | 3 |
| Stannous octoate sol'n. % w/w | 0.02 | 0.02 | 0.02 | 0.02 | 0.02 | 0.02 |
| Lubricant (amide wax) % w/w | 0.25 | 0.25 | 0.25 | 0.25 | 0.25 | 0.25 |
| Antioxidant (hindered phenol) % w/w | 0.25 | 0.25 | 0.25 | 0.25 | 0.25 | 0.25 |
| Stabaxol ® M[2] % w/w | — | — | 1.05 | — | 2.9 | — |
| Stabaxol ® P[3] % w/w | — | — | — | 1.05 | — | 2.9 |
| NCO/OH | 1.02 | 1.02 | 1.02 | 1.02 | 1.02 | 1.02 |
| Polymer clarity | clear | clear | clear | translucent | clear | opaque |

Footnotes to Table III
[1]The same blend defined in footnote 1 Table I.
[2]Stabaxol ® M is 2,2',6,6'-tetraisopropyldiphenylcarbodiimide and is supplied by Mobay Chem. Co., Pittsburgh, Penna.
[3]Stabaxol ® P is a polycarbodiimide, softening point 50° C. and is supplied by Mobay Chem. Co.

Sample 3 was identical in formulation to sample 1 of Example 1. The same isocyanate blend described in footnote 1 of Table I was employed in sample 4.

Samples 5 and 6 contained known prior art carbodiimide containing additives used to provide enhanced hydrolytic stability to various polymer systems including polyester polyurethanes. The additives were added to the present formulations 5 and 6 in amounts such that the carbodiimide content was kept constant in each polymer. Addition of these additives were made to the MDI ingredient prior to the one-shot reaction of the isocyanate with the resin component.

Samples 7 and 8 are similar to 5 and 6 except for the increased amounts of carbodiimide stabilizing additives.

Similarly to Example 1 the polyurethane samples 3 through 8 were tested for hydrolytic stability. However, this time the samples were subjected only to the most rigorous conditioning (c) and their properties were compared to corresponding control samples kept under ambient conditions (a). The comparison of properties is set forth in Table IV below.

A comparison between the properties of the (a) series versus the (c) series shows that all the carbodiimide containing samples 4 through 8 exhibited improved resistance to hydrolysis as compared to sample (3c) which showed complete loss of tensile strength and elastic modulus over its control (3a) sample.

Sample 4 in accordance with the present invention possessed comparable resistance to hydrolysis when compared with prior art samples 5 to 8 and superior tensile strength retention when compared specifically to samples 5 and 7. As noted in Table III, the polymer clarity of sample 4 was clear compared to samples 6 (translucent) and 8 (opaque).

Approximately 20 g. samples of polyurethane samples 4, 7, and 8 were each extracted with 300 ml. of methylene dichloride for about two days at room temperature. Each extract was then concentrated in vacuo until almost all solvent was removed. Examination of each residue by infrared spectroscopy showed the presence of the carbodiimide band at 2170 cm$^{-1}$ and 2160 cm$^{-1}$ for samples 7 and 8 respectively and the total absence of carbodiimide absorption for sample 4.

In the case of the extraction of sample 8 the residue was evaporated to dryness to remove all of the methylene dichloride and this solvent free residue was extracted with 200 ml. of hexane at 50° C. for 5 minutes.

The hexane extract was evaporated and the resulting residue had an I.R. spectrum almost identical to that of the original carbodiimide additive Stabaxol ® P.

Therefore, sample 4 in accordance with the present invention can be characterized as a completely clear elastomer with excellent hydrolytic stability. If comparable hydrolytic stability is achieved by prior art methods, the elastomer is not clear but is translucent to opaque. Furthermore, the prior art method of stabilizing the elastomer to hydrolytic conditions is not stable to solvent leaching whereas the present method is stable to solvent.

equivalent percent of the second MDI described in footnote 1 of Table I providing 0.056 mole of monocarbodiimide per isocyanate equivalent. Samples 10, 11, 13 and 14 employed blends of pure MDI with the second MDI in the equivalent percent mixtures of 90/10, 85/15, 50/50, and 25/75 respectively. The concentrations of carbodiimide provided in the various samples are set forth in Table V.

Samples 10 through 13 inclusive are in accordance with the present invention while samples 9, 14, and 15 are not. The lack of carbodiimide is evident in the 9a–9c comparison wherein the elastic moduli could not be

TABLE IV

| Sample | 3a | 3c | 4a | 4c | 5a | 5c | 6a | 6c | 7a | 7c | 8a | 8c |
|---|---|---|---|---|---|---|---|---|---|---|---|---|
| Elastic Modulus, psi | | | | | | | | | | | | |
| 50% | 850 | * | 800 | 640 | 750 | 610 | 850 | 690 | 720 | 620 | 850 | 710 |
| 100% | 1000 | * | 975 | 840 | 925 | 780 | 1025 | 870 | 850 | 740 | 975 | 850 |
| 300% | 1650 | * | 1670 | 1390 | 1440 | 1260 | 1600 | 1440 | 1250 | 1190 | 1500 | 1340 |
| Tensile str., psi | 6900 | 380 | 7510 | 5740 | 5890 | 3820 | 6375 | 5710 | 3840 | 2150 | 5400 | 4670 |
| Elongation at break (%) | 650 | 40 | 610 | 700 | 660 | 740 | 640 | 700 | 720 | 675 | 750 | |
| Tensile set, (%) | 25 | 5 | 20 | 50 | 25 | 90 | 25 | 50 | 80 | 140 | 50 | 80 |

*Sample crumbled and modulus properties could not be determined.

EXAMPLE 3

A series of elastomer samples 9 through 15 were compared for their humid age stability and thermoplastic processability and behaviour by comparing their properties after storage under the (a) and (c) conditions described in Example 1 and noting their injection moldability. The results are set forth in Table V below.

Samples 9 and 12 are the renumbered samples 3 and 4 set forth in Table III along with their humid age properties set forth in Table IV under 3a, 3c, and 4a, 4c respectively.

Samples 10, 11, and 13 to 15 were prepared in accordance with the procedure, ingredients, and proportions set forth in Example 1, Table I, except for the substitution of the following isocyanate components in the respective formulations. Sample 15 employed 100 determined after humid aging due to deterioration of the sample.

Samples 10 through 13 maintained the major portion of their physical properties while maintaining their thermoplasticity and capability for injection molding. Samples 14 and 15, on the other hand, while maintaining their physical properties, are not truly thermoplastic materials. The stress lines in the molded sheets are due to poor polymer flow and the use of any higher barrel temperature to help improve flow would result in polymer degradation.

TABLE V

| Sample | 9a | 9c | 10a | 10c | 11a | 11c | 12a | 12c |
|---|---|---|---|---|---|---|---|---|
| Moles carbodiimide per NCO eq. | 0 | | 0.0056 | | 0.0084 | | 0.014 | |
| Elastic Modulus, psi | | | | | | | | |
| 50% | 850 | * | 965 | 750 | 925 | 770 | 800 | 640 |
| 100% | 1000 | * | 1095 | 870 | 1100 | 900 | 975 | 840 |
| 300% | 1650 | * | 1685 | 1290 | 1755 | 1410 | 1670 | 1390 |
| Tensile str., psi | 6900 | 380 | 6560 | 3800 | 6695 | 4560 | 7510 | 5740 |
| Elongation at break (%) | 650 | 40 | 665 | 680 | 600 | 730 | 610 | 700 |
| Tensile set, (%) | 25 | 5 | 35 | 110 | 35 | 110 | 20 | 50 |
| Injection molding barrel temp., °F. | 410 | | 420 | | 420 | | 430 | |
| Thermoplasticity | good | | good | | good | | good | |

| Sample | 13a | 13c | 14a | 14c | 15a | 15c |
|---|---|---|---|---|---|---|
| Moles carbodiimide per NCO eq. | 0.028 | | 0.042 | | 0.056 | |
| Elastic Modulus, psi | | | | | | |
| 50% | 865 | 730 | 925 | 820 | 955 | 795 |
| 100% | 1060 | 980 | 1120 | 1045 | 1160 | 995 |
| 300% | 1820 | 1865 | 1980 | 1835 | 2095 | 1500 |
| Tensile str., psi | 7415 | 7015 | 6960 | 6190 | 7300 | 3300 |
| Elongation at break (%) | 550 | 630 | 520 | 660 | 495 | 560 |
| Tensile set, (%) | 10 | 20 | 15 | 30 | 10 | 70 |
| Injection molding barrel temp., °F. | 440 | | 440 | | 440 | |
| Thermoplasticity | fair no stress lines in molded sheets | | poor stress lines in molded sheets | | very poor many stress lines in molded sheets | |

*Sample crumbled and modulus properties could not be determined.

We claim:

1. In a thermoplastic polyester polyurethane prepared from a polyester diol, a difunctional extender, and methylenebis(phenyl isocyanate) the improvement which comprises employing a methylenebis(phenyl isocyanate) which contains from about 0.0025 mole to about 0.03 mole per equivalent of isocyanate of (i) a monocarbodiimide product derived from a methylenebis(phenyl isocyanate) or (ii) the corresponding uretidinedioneimine adduct formed by said monocarbodiimide with said methylenebis(phenyl isocyante).

2. A thermoplastic polyurethane according to claim 1 wherein said methylenebis(phenyl isocyanate) in both cases is 4,4'-methylenebis(phenyl isocyanate).

3. A thermoplastic polyurethane according to claim 2 wherein said 4,4'-methylenebis(phenyl isocyanate) is comprised of a blend of from about 50 to about 95 equivalent percent of 4,4'-methylenebis(phenyl isocyanate) and the remaining 5 to 50 equivalent percent being a 4,4'-methylenebis(phenyl isocyanate) containing from about 0.05 mole to about 0.06 mole per equivalent of said latter isocyanate of the monocarbodiimide product derived from said 4,4'-methylenebis(phenyl isocyanate) or the corresponding uretidinedioneimine adduct formed by said monocarbodiimide with said 4,4'-methylenebis(phenyl isocyanate).

4. A thermoplastic polyurethane according to claim 1 wherein said polyester diol is a polyalkylene ester diol.

5. A thermoplastic polyurethane according to claim 1 wherein said difunctional extender is an aliphatic straight chain diol having from two to six carbon atoms, inclusive.

6. A thermoplastic polyurethane according to claim 1 wherein the equivalent proportion of said polyester diol to said difunctional extender is within the range of about 1:1 to about 1:12 and the overall ratio of equivalents of isocyanate to equivalents of active hydrogen containing materials is within the range of 0.95:1 to 1.10:1.

7. A thermoplastic polyurethane prepared from:
(a) a blend comprising from about 50 to about 95 equivalent percent of 4,4'-methylenebis(phenyl isocyanate) and the remaining 5 to 50 equivalent percent being 4,4'-methylenebis(phenyl isocyanate) containing from about 0.05 mole to about 0.06 mole per equivalent of said latter isocyanate of (i) the monocarbodiimide product derived from said 4,4'-methylenebis(phenyl isocyanate), or (ii) the corresponding uretidinedioneimine adduct formed by said monocarbodiimide with said 4,4'-methylenebis(phenyl isocyanate),
(b) a polyalkylene ester diol,
(c) an aliphatic straight chain diol having from two to six carbon atoms, inclusive,
wherein the equivalent proportions of (b) to (c) is within the range of from about 1:1 to 1:12 and the overall ratio of equivalents of isocyanate to equivalents of active hydrogen materials is within the range of 0.95:1 to 1.10:1.

8. A thermoplastic polyurethane according to claim 7 wherein (a) is comprised of a 75/25 equivalent percent blend of 4,4'-methylenebis(phenyl isocyanate) and said 4,4'-methylenebis(phenyl isocyanate) containing said (i) or (ii) respectively.

9. A thermoplastic polyurethane according to claim 8 wherein (b) is a polyethylene adipate diol having a molecular weight of from about 1500 to about 2500 and (c) is 1,4-butanediol.

* * * * *